United States Patent [19]
Marrs et al.

[11] Patent Number: 4,747,673
[45] Date of Patent: May 31, 1988

[54] HIGH POWER OPTICAL ATTENUATOR

[75] Inventors: C. Denton Marrs; William N. Faith, both of Ridgecrest, Calif.

[73] Assignee: The United States of America as represented by the Secretary of the Navy, Washington, D.C.

[21] Appl. No.: 55,963

[22] Filed: Jun. 1, 1987

[51] Int. Cl.$^4$ ............................. G02F 1/21; G02B 5/28
[52] U.S. Cl. .................................... 350/372; 350/408; 350/166
[58] Field of Search ................. 350/1.6, 372, 394, 408, 350/164, 166

[56] References Cited
U.S. PATENT DOCUMENTS
2,941,444  6/1960  Frykman ............................. 350/166

Primary Examiner—Bruce Y. Arnold
Attorney, Agent, or Firm—W. C. Townsend; W. Thom Skeer; Stephen J. Church

[57] ABSTRACT

An attenuator for high power laser beams, the attenuator has an annular beam dump through which the beam passes diametrically and in which the beam passes successively through a pair of pivoting transmissive and reflective element. These elements are individually mounted on intermeshed gears so that the elements are adjustable through equal and opposite angles. At each element a portion of the beam is reflected toward the dump and a portion transmitted, the relative energy in each portion being determined by the angle of the elements to the beam so that adjustment of this angle determines the amount of attenuation. The beam is offset oppositely by refraction at each element so that the attenuator does not change the beam path. The elements are, preferably, elements commonly used as edge filters, that is, interference filters having an abrupt monotonic transition with wavelength from reflection to transmission.

6 Claims, 2 Drawing Sheets

HIGH POWER OPTICAL ATTENUATOR

BACKGROUND OF THE INVENTION

This invention relates to optical attenuators and more particularly to optical attenuators suitable for use with intense light sources such as high-energy lasers.

Optical attenuators are a standard tool used in most optical work. However, when the optical system involves high-energy lasers, controlled attenuation for prolonged periods is difficult to achieve.

Optical attenuation has previously been accomplished in various way, none of which has proven to be adequate when used in conjunction with high-power lasers. These ways involve the use of (1) bulk absorption or reflective attenuation plates, also known as neutral density filter; (2) Glan-Laser prisms; and (3) Brewster wedges.

A reflective attenuation plate consists of a thin, semi-transparent metal film placed on or between two sheets of glass. These do not work at high-power levels because the metal film tends to burn off. A bulk absorption attenuation plate consists of semitransparent glass that attenuates by absorbing a portion of the incident light in transmission. At high incident powers these fail by optical bleaching or fracture.

A Glan-Laser prism consists of two birefringent prisms separated by an air space. When used for attenuation two of these prisms are required. Rotating one prism about its optical axis with respect to the other will reduce the transmission through both. This is equivalent to the transmission decrease observed through crossed polarizers. However, when a high-power laser beam passes through the transparent material of the prisms, localized heating causes spatial distortion in the transmitted beam. This is not acceptable for applications where spatial beam coherence is required. A ½ wave waveplate can be used instead of one prism and this can lower the level of distortion. However, Glan-Laser prisms are not suitable for use at very high power levels and produce a linearly polarized laser beam.

Brewster wedges are made of transparent materials such as glass, $SiO_2$, $Al_2O_3$, $CaF_2$, or Ge. It is known that when the angle of incident of light is at Brewster's angle on one of these materials, the transmitted light is unattenuated. As the angle of incidence is changed from Brewster's angle the transmitted light is reduced by Fresnal reflections, typically 3 to 4% for these materials per surface in the visible and near infrared. Wedges are used to eliminate interference between the Fresnal reflections. If these are to be used in a non-distorting attenuator with a large dynamic range, a large number of wedges must be used, and these must be carefully aligned. This tedious and expensive and produces a transmitted beam that varies in polarization as the angle of rotation varies.

SUMMARY OF THE INVENTION

Accordingly, one object of this invention is to provide an optical attenuator, which may be used in conjunction with high powered light beams.

A further object is to provide a high energy optical attenuator, which may be used over prolonged periods without optical distortion or failure of its of its optical components.

Yet another object is to provide a high power optical attenuator that does not require the use of a large number of carefully aligned Brewster wedges.

Still another object is to provide a high power optical attenuator which preserves the polarization of a beam attenuated thereby.

These and other objects are achieved by a device wherein the high energy beam is directed through a first transmissive and reflective element wherein a portion of the light is reflected out of the beam path to a beam dump and a portion is transmitted through the element and offset by refraction. The transmitted light thereafter passes through a second transmissive and reflective element that is counterrotated with respect to the first element. This second element provides further attenuation and also restores the beam to its original path. Precise counterrotation of the elements with respect to each other is achieved by attaching the elements individually to intermeshed, equal diameter gear wheels. Each transmissive and reflective element is, preferably, an edge filter element commonly used as an interference filter and having an abrupt monotonic transition between reflection and transmission.

BRIEF DESCRIPTION OF THE DRAWINGS

The nature of the invention and its several features and objects will be readily apparent from the following detailed description when considered in connection with the following drawings wherein.

DESCRIPTION OF THE PREFERRED EMBODIMENT

Figure 1:
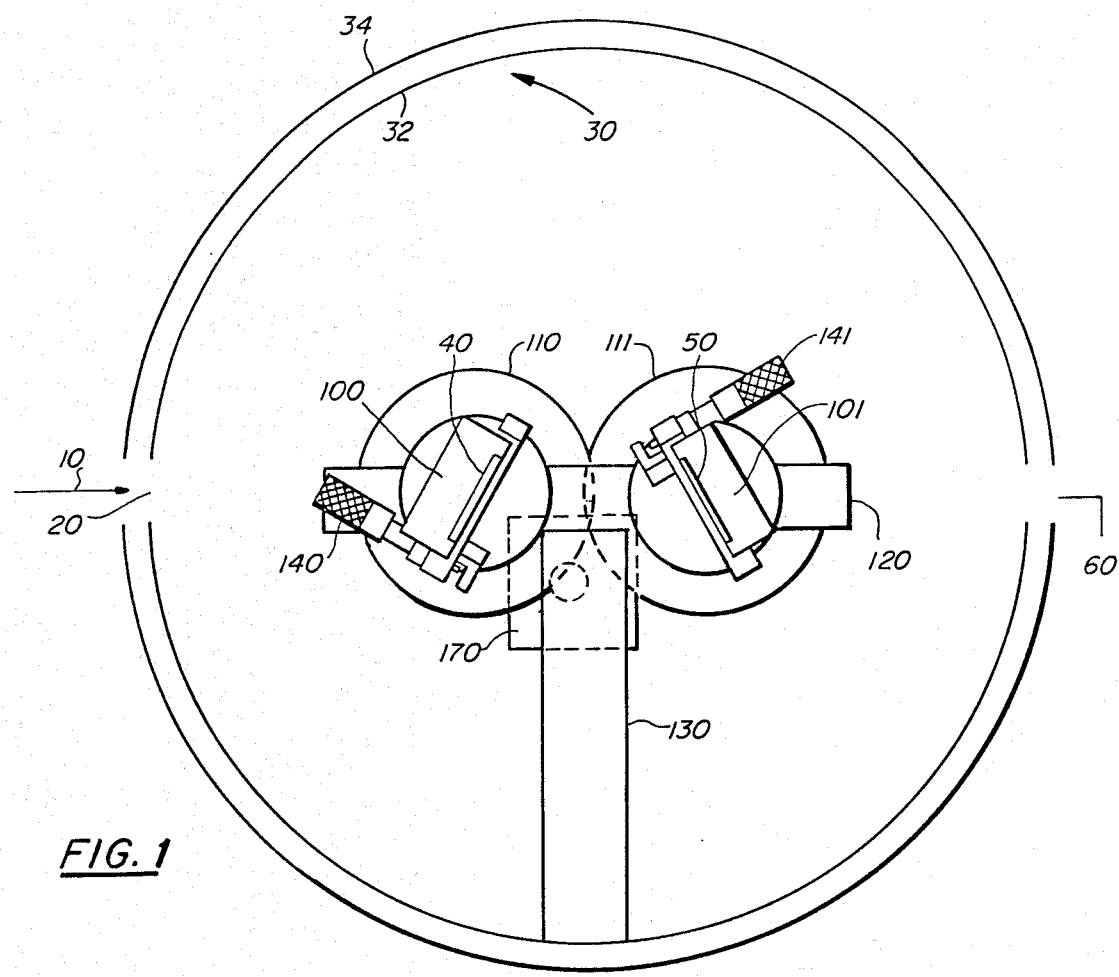
FIG. 1 is an elevation of an optical attenuator embodying the present invention.
Figure 2:
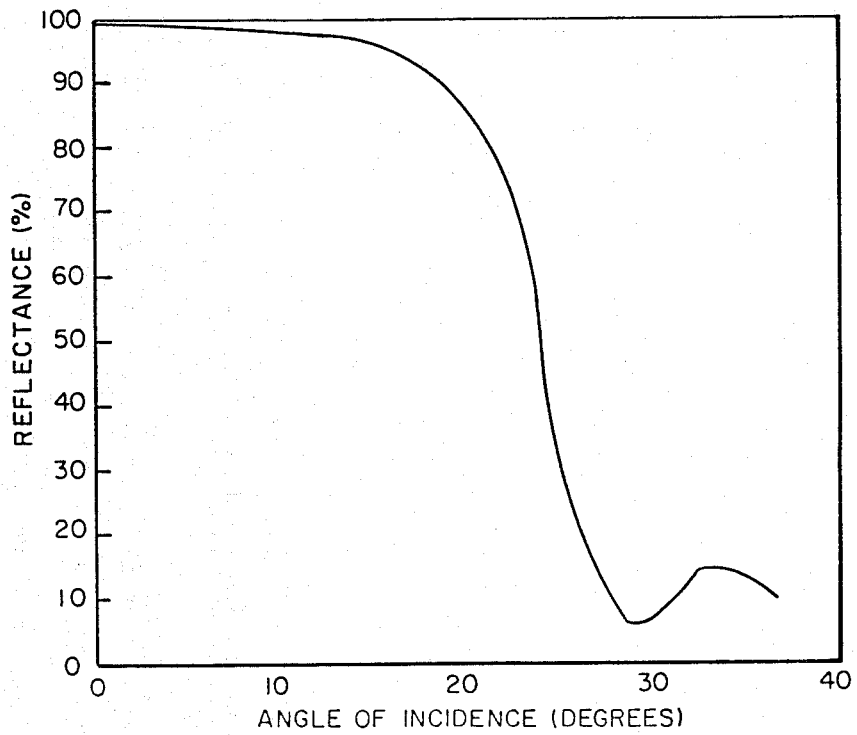
FIG. 2 is a graph showing the reflectance versus angle of incidence for a transmissive and reflective elements of the attenuator of FIG. 1.

FIGS. 1 and 2 show an attenuator or attenuator apparatus which embodies the present invention. A high power light beam 10 to be attenuated enters the attenuator through an entry port 20, which is an opening in a cylindrical energy absorbing shell or annular beam dump 30. Beam 10 passes successively through a first transmissive and reflective element 40 and a second, and substantially identical, transmissive and reflective element 50. Beam 10 then exits through an output port 60, which is also an opening in beam dump 30 and is diametrically opposite port 20 so that these ports define, for beam 10, a path across which elements 40 and 50 are disposed with element 50 between element 40 and port 60.

FIG. 2 shows typical values of the reflectance versus the angle of incidence of beam 10 for either element 40 or 50. Beam 10 is partially reflected off the surface of an element 40 or 50, and is partially transmitted through the element with refraction varying as the angle of incidence with the element is changed. The reflected portion of light energy from beam 10 impacts upon dump 30 and is absorbed.

Beam dump 30 has an inner ring 32 constructed from copper wire mesh. Mesh ring 32 acts as a heat sink that distributes and carries away energy absorbed from the reflected portion of the beam. The outside of beam dump 30 is a solid outer ring 34 which circumscribes ring 32 and which, preferably, is coated exteriorly with black paint so that energy is radiated efficiently. Preferably, the interior of ring 34 is somewhat reflective so that a beam portion impacting thereon is repeatedly reflected across beam dump 30 and all of the energy of the beam portion is not absorbed at one location of the beam dump.

Figure 3:
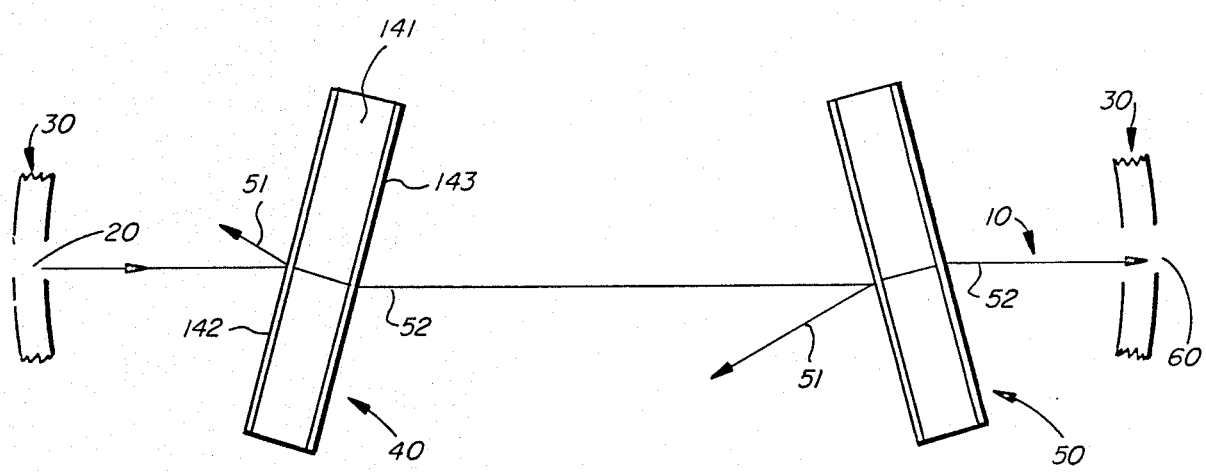
FIG. 3 is a diagram of such elements, a fragmentarily represented beam dump, and a light beam showing that the beam direction is not spatially deviated by the attenuator.

As is apparent from FIGS. 1 and 3, where beam 10 is non-normal to elements 40 and 50, a first portion 51 of beam 10 is reflected by each element toward beam dump 30 while a second portion 52 is transmitted through the element and offset by refraction. The ratio of reflection to transmission determines the amount of attenuation delivered by the subject attenuator. This ratio is adjusted by altering the angle of incidence between beam 10 and the flat incident surfaces of elements 40 and 50, such surfaces being shown normal to beam 10 in FIG. 4.

Figure 4:
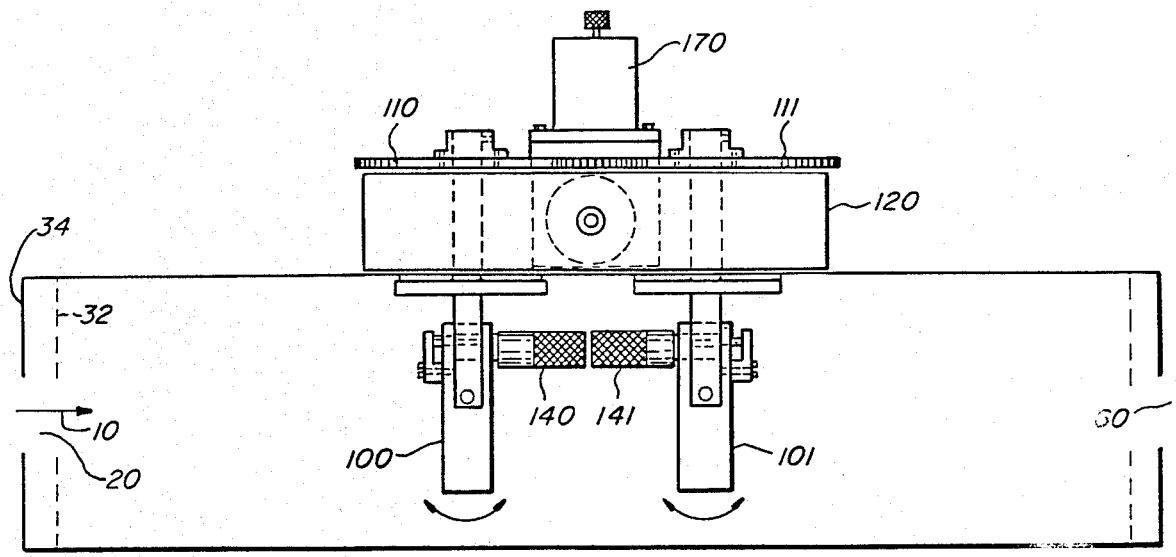
FIG. 4 is a plan of the attenuator, with a beam dump sectioned to show elements therein.

FIGS. 1 and 4 show an arrangement by which the angles of incidence between beam 10 and the elements 40 and 50 are adjusted. Elements 40 and 50 are attached to optical mounts 100 and 101. These mounts are, in turn, attached respectively to intermeshed and, therefore, counter rotating gears 110 and 111. Elements 40 and 50 are mounted centrally on a side of the corresponding gear 110 or 111, this side being adjacent to the path of beam 10 between ports 20 and 60. Gears 110 and 111 are of equal diameter and are rotationally mounted upon a horizontal support beam 120, which is, in turn, mounted upon a vertical support beam 130 which connects the entire arrangement with beam dump 30. The angles of incidence that beam 10 makes with the elements 40 and 50 are thus adjustable in opposite directions through a predetermined angular range by rotation of the meshed gears. This rotation is typically accomplished with a stepper motor 170, which causes gears 110 and 111 to rotate so that elements 40 and 50 may be selectively pivoted simultaneously. Alignment of each element 40 and 50 in a plane normal to the plane in which the element is rotated by gears 110 and 111 is, typically, accomplished using micrometer adjustment devices 140 and 141 which are attached, respectively, to mounts 100 and 101.

Gears 110 and 111 are thus configured so that elements 40 and 50 contact beam 10 at conjugate angles, that is, angles which are equal in magnitude but opposite in sign or direction. The second beam portion 52 refracted in element 40 and transmitted therethrough is offset from its original path in this element. Since element 50 is arranged to contact beam 10 at the conjugate angle to the angle at which the beam contacts element 40, the beam will be restored to its original path so that entry port 20 is aligned diametrically of beam dump 30 with output port 60.

Each element 40 or 50 is, preferably, a well known "edge filter" and, as exemplified by element 40 in FIG. 3, has a central layer 141 of transparent dielectric material. Layer 141 has, on the incident side, a dielectric stack edge filter coating 142, and has, on the opposite side, a dielectric stack antireflective coating 143. The combination of edge filter coating 142 with entireflective coating 143 assures that the ratio of reflection to transmission in elements 40 and 50 will be stable over the entire cross section of light beam 10.

Edge filters suited for the practice of the present invention are commonly used as optical interference filters characterized by a relatively abrupt transition, or "edge", from efficient reflection to efficient transmission, this transition being wavelength dependent and occurring near a predetermined wavelength with light at normal, or zero degrees, incidence. However, as will be apparent to one skilled in the art of interference filters that, when such an edge filter is used with normally incident light of a wavelength somewhat shorter than that at which such a normal incidence transition occurs, an increase in the angle of incidence from normal will increase the optical distance between layers of the filter so that there occurs, at such shorter wavelength, a transition from reflectance to transmission. Such a transition is typified in the curve of FIG. 2 by the monotonically decreasing reflectance region where the angle of incidence is increasing from zero degrees to nearly thirty degrees, the portion of the light not reflected being transmitted as a beam portion 52 of FIG. 3. Since the curve of reflectance of an edge filter used in this manner with varying angle of incidence instead of varying wavelength, has a relatively abrupt transition, such a filter used as an element 40 or 50 of the subject apparatus may be referred to as an "edge mirror".

The curve of reflection of such an edge mirror typically has a region, such as that shown in FIG. 2 beyond thirty degrees, which is not monotonic due to interference effects. Such an edge mirror has typically near a 55 degree angle of incidence and thus not shown in FIG. 2, another non-monotonic region near the Brewster angle of the dielectric material of central layer 141. However, such regions are not utilized in the present attenuator since maximum attenuation occurs with angles of incidence near zero degrees.

It will be apparent to one skilled in the art that, since the ratio of the energy in beam portions 51 and 52 is determined by interference effects at layer 142 of elements 40 and 50 rather than by polarization dependent effects such as birefringence or Fresnel reflection near Brewster's angle, the state of polarization of incident beam 10 is preserved in transmitted beam portions 52 and this state is preserved in transmitted beam portions 52 and is preserved in transmitted beam portions 52 and not affected by the degree of polarization provided by an attenuator of the present invention. It will also be apparent that edge filters or other transmissive and reflective optical elements, otherwise similar to elements 40 and 50 but whose reflectance monotonically decreases and whose transmission monotonically increases with decreasing angle of incidence, may be used with an apparatus like that of FIGS. 1 and 4 by decreasing the conjugate angles between such elements to provide greater attenuation.

The described embodiment of this device employing edge filters for elements 40 and 50 has been tested at an average power level of greater than 500 watt/sq cm for high repetition rate pulsed lasers with peak powers greater than 5 megawatts/sq cm with no beam distortion or component failure. This embodiment provides attenuation factors greater than $9 \times 10^3$.

From the foregoing description, it can be seen that the invention is adapted to attain each of the objects set forth together as well as other advantages which are inherent in the apparatus. The detailed description of the invention herein has been with respect to the preferred embodiment. However, it will be understood that variations and modifications can be effected within the spirit and scope of the invention as defined in the appended claims.

What is claimed is:

1. An optical attenuator comprising:
   an annular beam dump defining, for a beam to be attenuated, an inlet port and a diametrically opposite outlet port, said ports defining a beam path therebetween;
   a first transmissive and reflective element and a substantially identical second transmissive and reflective element disposed across said path with said second element between said first element and the outlet port, each of said elements having an incident side from which a first portion of said beam is reflected with a second portion thereof being transmitted through the element and offset by refraction in a direction transversely of said path; and
   means mounting said elements for selective and simultaneous pivotal movement through a predetermined angular range with said elements pivoting in opposite directions so that at each element such a first portion is reflected toward the beam dump for absorption thereat and such a second portion is offset by refraction oppositely and equally at said second element from a corresponding such offset at the first element so that at the second element such a second portion leaves along said path and through the outlet port at every position of said elements in said angular range.

2. The attenuator of claim 1 wherein each of said transmissive and reflective elements is an edge filter.

3. The attenuator of claim 1 wherein the ratio of the energy of said reflected first portion to the energy of said transmitted second portion is determined substantially by interference at each of said elements so that the state of polarization of said beam is unchanged by the attenuator.

4. The attenuator of claim 1 wherein each of said transmissive and reflective elements is characterized by having the ratio of the energy of said reflected first portion to the energy of said transmitted second portion increase monotonically as the angle of incidence of said beam on the element approaches zero.

5. The attenuator of claim 1 wherein said beam dump comprises an inner ring of metallic mesh and an outer ring circumscribing the inner ring.

6. The attenuator of claim 1 wherein said mounting means comprises a pair of intermeshing, equal diameter gears rotationally mounted on the beam dump and disposed adjacent to said path, said elements being individually and centrally mounted on said gears.

* * * * *